(12) United States Patent
Kirby

(10) Patent No.: US 8,296,096 B2
(45) Date of Patent: Oct. 23, 2012

(54) POSITIONING SYSTEM AND METHOD USING OPTICALLY TRACKED ANCHOR POINTS

(76) Inventor: Richard Kirby, Heber City, UT (US)

( * ) Notice: Subject to any disclaimer, the term of this patent is extended or adjusted under 35 U.S.C. 154(b) by 382 days.

(21) Appl. No.: 12/500,589

(22) Filed: Jul. 9, 2009

(65) Prior Publication Data

US 2011/0010129 A1    Jan. 13, 2011

(51) Int. Cl.
*G01C 9/00* (2006.01)
*G06F 11/00* (2006.01)
(52) U.S. Cl. ......... 702/153; 702/150; 702/188; 702/189
(58) Field of Classification Search .......... 702/150–158, 702/182–189
See application file for complete search history.

(56) References Cited

U.S. PATENT DOCUMENTS

| 4,879,664 A | 11/1989 | Suyama |
| 5,692,061 A | 11/1997 | Sasada |
| 5,802,202 A | 9/1998 | Yamada et al. |
| 6,737,644 B2 | 5/2004 | Shaffer |
| 2002/0005956 A1 | 1/2002 | Bretschneider |
| 2008/0158679 A1 | 7/2008 | Luty |
| 2008/0243429 A1 | 10/2008 | Yoshino |
| 2009/0063097 A1* | 3/2009 | Vock et al. ............... 702/182 |

FOREIGN PATENT DOCUMENTS

EP    2 058 624 A1    5/2009

* cited by examiner

*Primary Examiner* — Phuong Huynh

(57) ABSTRACT

A method and system for determining the location and attitude (roll, pitch, and yaw) of a moving object relative to an external reference frame by tracking unique two-dimensional patterns in the external reference frame from the moving object with displacement sensors. The displacement sensors lock onto the unique two-dimensional patterns by means of a steering mechanism which steers an optical path element capable of deviating the optical path using the displacement information from the relative movement of the two-dimensional patterns. The system is able to detect position and attitude to sub-millimeter accuracy without a physical connect between the moving object and the external reference frame and without a physical connection between the moving object and the external reference frame.

19 Claims, 22 Drawing Sheets

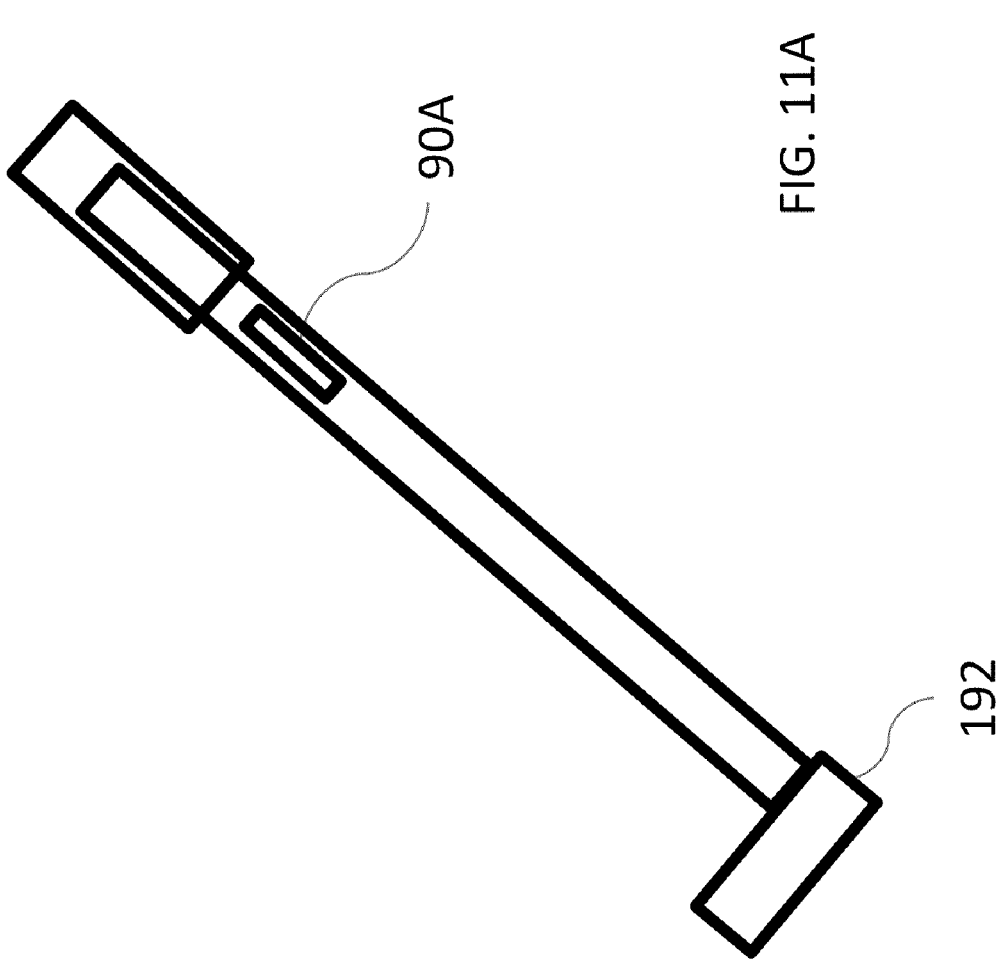

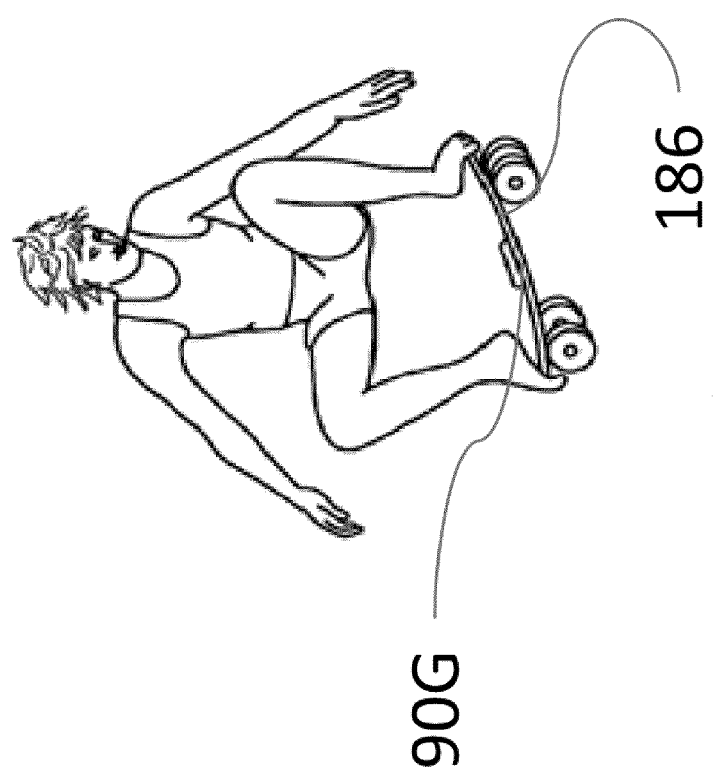

POSITIONING SYSTEM AND METHOD USING OPTICALLY TRACKED ANCHOR POINTS

CROSS-REFERENCE TO RELATED APPLICATIONS

Not applicable.

FEDERALLY SPONSORED RESEARCH

Not applicable.

SEQUENCE LISTING OR PROGRAM

Not applicable.

BACKGROUND OF THE INVENTION

1. Field of Invention

This invention relates to positioning systems, specifically to an improved absolute positioning system where one or more anchor points are tracked and position is determined by triangulation from the anchor points.

2. Prior Art

Numerous methods have been proposed to position a moving object with respect to a fixed frame of reference. One of the early systems, celestial navigation, is a position fixing technique that was devised to help sailors cross the oceans. Celestial navigation uses angular measurements between common celestial objects or to the horizon. The Sun and the horizon are most often measured. Skilled navigators can use the moon, planets or one of 57 navigational stars whose coordinates are tabulated in nautical almanacs.

Modern versions of celestial navigation are used in satellites to track their angular orientation by comparing images taken by the satellite to a star map programmed into the memory of the satellite mounted stellar sensor. By identifying the stars observed and determining the relative orientation of navigation from the Earth, however, requires that the stars be visible and accuracy is limited (Sextants give position to a 5 kilometer radius).

LORAN is a terrestrial radio navigation system using low frequency radio transmitters that uses multiple transmitters to determine location and/or speed of the receiver. Loran requires an extensive terrestrial transmitter network and reported accuracy is +/−8 meters.

Global Navigation Satellite Systems (GNSS) allow small electronic receivers to determine their location (longitude, latitude, and altitude) to within a few meters using time signals transmitted along a line-of-sight by radio from satellites. Receivers on the ground with a fixed position can also be used to calculate the precise time as a reference for scientific experiments. In addition to the limited accuracy, GNSS is not capable of determining the attitude (roll, pitch, and yaw) of the receiver, is susceptible to signal blockage (buildings, mountains, etc.) and requires an expensive infrastructure external to the receiver (the satellite network).

GNSS accuracy can be augmented using external information, often integrated into the calculation process, to improve the accuracy, availability, or reliability of the satellite navigation signal. There are many such systems in place and they are generally named or described based on how the GNSS sensor receives the information. The best of these systems is reported to reduce the error to +/−10 cm and requires a more extensive external infrastructure than the satellite network.

Inertial systems comprised of accelerometers and gyroscopes are capable of detecting acceleration in each of the 6 axes (x, y, z, roll, pitch, and yaw) and by taking a double integral of the acceleration data one can calculate the change in position from a starting point. However, each measurement from an inertial sensor represents the change from the previous measurement. Because of this, inertial systems are prone to develop errors caused by random drift (also known as random walk). This drift follows the binomial distribution which says that the expected error is equal to the square root of the number of samples times the average error in a sample. For a system that takes 100 samples a second and has an error of 0.1% per sample, the system has an expected error of 24.5% after 10 minutes.

Positioning the six degrees of freedom to sub-millimeter accuracy, while less important for navigation, is required for many types of motion analysis. Prior art FIG. 1 (US Patent Application No 2009/0063097) shows a system for measuring athletic performance using accelerometers. Sports scientist have made numerous attempts to study athlete movement using a combination of augmented GNSS signals combined with inertial sensor systems like those of FIG. 1 without success due to the above described issues with GNSS and the random drift inherent in inertial sensor systems.

Today, there does not exist a positioning system capable of measuring x, y, z, roll, pitch and yaw to sub-millimeter accuracy without an external infrastructure or a physical connections between the moving object and the fixed frame of reference. For these reasons and for other reasons stated below which will become apparent to those skilled in the art upon reading and understanding the specification there is a need in the art for a means to determine the absolute position (x, y, z) and attitude (roll, pitch, yaw) of an object which is free to move in an external reference plane to sub-millimeter accuracy.

3. Objects and Advantages

Accordingly, several objects and advantages of the present invention are:
   (1) to provide a system capable of determining the position (x, y, z) and attitude (roll, pitch, and yaw) of a moving object within an external reference frame to sub-millimeter accuracy.
   (2) to provide a system capable of determining accurately the position and attitude without a fixed infrastructure of transmitters, targets, or other prearranged devices.
   (3) to provide a system capable of determining accurately the position and attitude of the moving object without a physical connection to the external reference frame.
   (4) to provide a system capable of determining accurately the position and attitude of a moving object based on absolute measurements (as opposed to a system where each measurement is based on the previous measurement) to avoid the drift issues associated with accelerometers and gyroscopes.

Further objects and advantages of this invention will become apparent from a consideration of the drawings and ensuing descriptions.

SUMMARY

In accordance with the present invention a positioning system and method using optically tracked anchor points to provide position (x, y, z) and attitude (roll, pitch, and yaw) of a moving object in relation to an external reference frame using optically tracked anchor points.

BRIEF DESCRIPTION OF THE DRAWINGS

In the drawings, closely related figures have the same number but different alphabetic suffixes."

FIGS. 11A-11G are illustrations of the integration of the positioning system of the invention into a moving objects in accordance with the invention.

DRAWINGS

Figure 1:
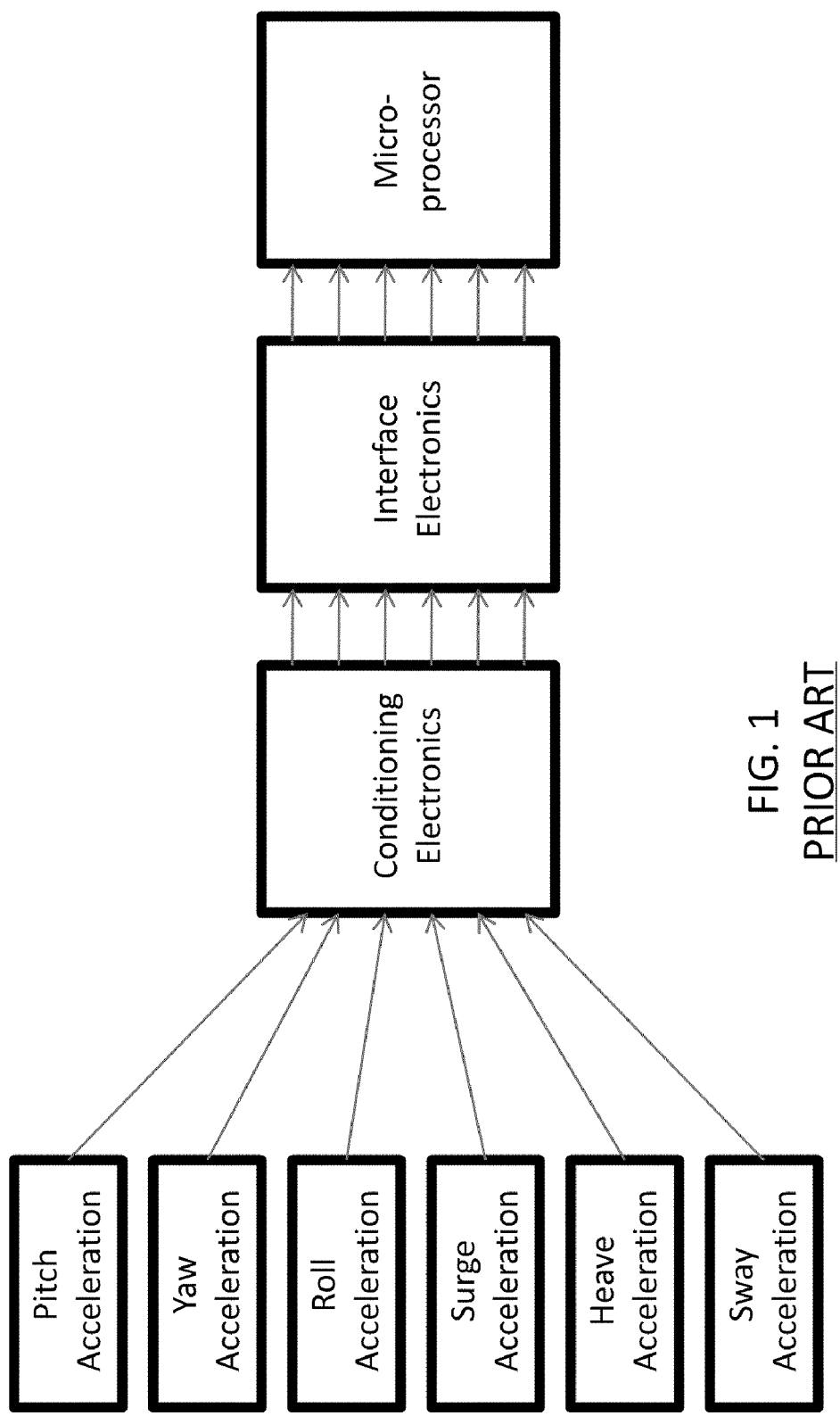
FIG. 1 is a prior art block diagram of a position measuring system using accelerometers from US Patent Application Publication No US 2009/0063097.

Reference Numerals 38A-38D apertures
40 moving object
42 data processing unit
44 data-collection unit
46 range finder
48 beam splitter
50 transmitter
52A-52B antenna
54 gimbaled aiming element
56 receiver
58 post-processor subsystem
60 memory
62 display
64 alarm
66 keyboard
68 inertial sensor
70A-70B battery
88 consolidated anchor point tracker
90A-90J positioning system
92A-92D two-axes anchor point trackers
94 pre-processor subsystem
96 moving reference frame
100 image n in series of images
101 image n+1 in series of images
103A-B unique trackable characteristic
103B grouping of pixels with a unique pattern in new position in image frame
104 first visual artifact
105 second visual artifact
110 sensor
112 imaging element
114 illumination control element
116 orientation element
118 imaging path steering element
120 steering mechanism
122 illumination source
124A-124D anchor points
126 external reference frame
130 navigation engine
154 mirror
156A-B piezoelectric device
160 image
162 image
180 ball
182 skate
184 racket
186 skate board
188 ski pole
189 ski
190 ski boot
191 skier
192 club
196 main program
200 initialization subroutine
210 anchor point stepper subroutine
220 scanning routine
230 decision subroutine
240 return subroutine
250 calibration routine
260 for-each-tracker subroutine
270 distance detecting subroutine
280 control block
290 calculation routine
300 return routine
310 tracking subroutine
320 data acquisition subroutine
330 computational subroutine
340 save and output subroutine
350 input routine
360 configuration saving procedure
370 timer
380 anchor point migration routine

DETAILED DESCRIPTION

FIGS. 2-6—Preferred Embodiment

Figure 2:
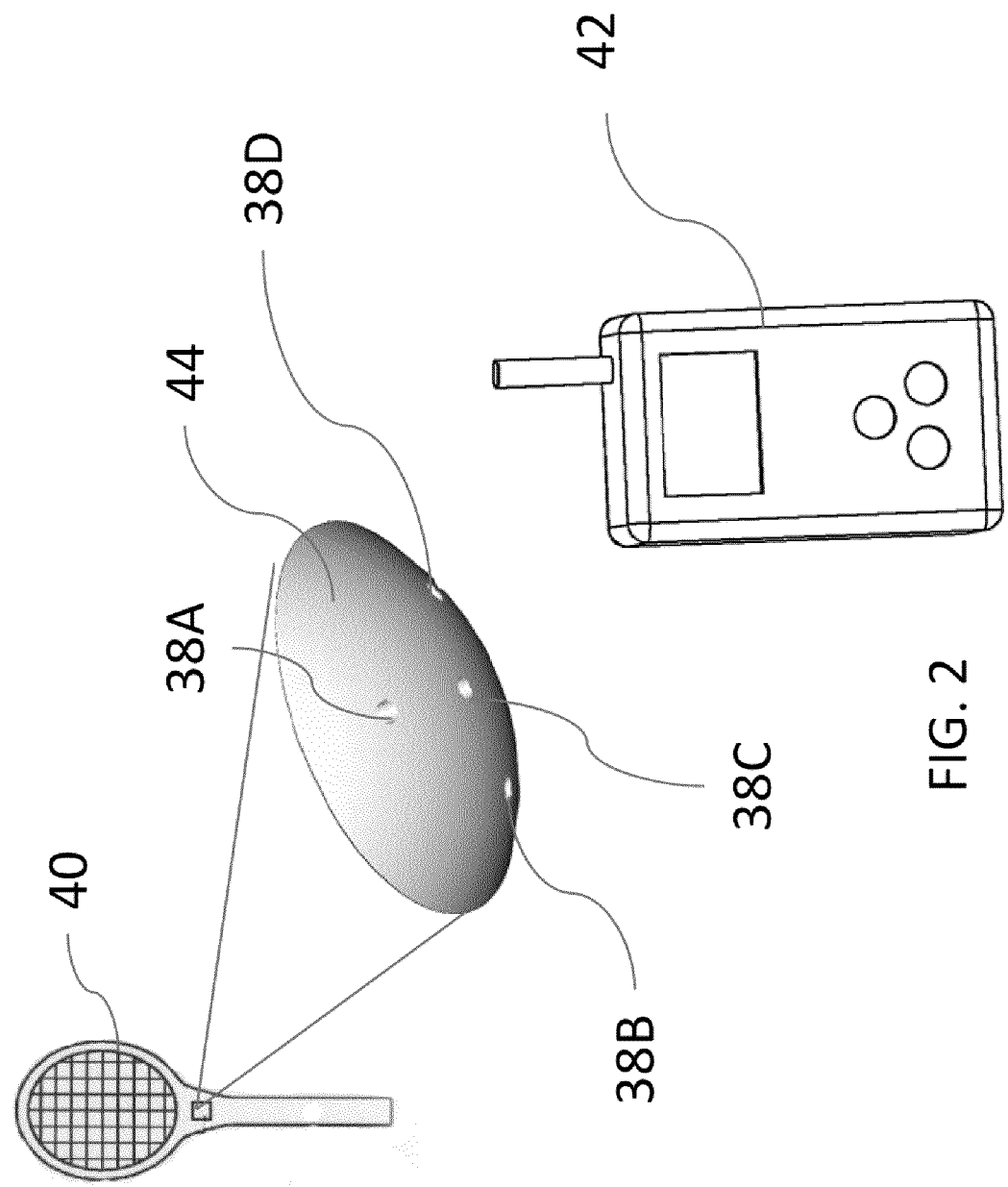
FIG. 2 is an illustration of one embodiment of the position measuring system of this invention comprising a data collection unit attached to a moving object communicating with a data processing unit.

FIG. 2 illustrates a positioning system according to the invention which comprises a data-collection unit 44 attached to a moving object 40 which communicates with a data-processing unit 42. A plurality of apertures 38A-38D are located in the data collection unit 44.

Figure 3:
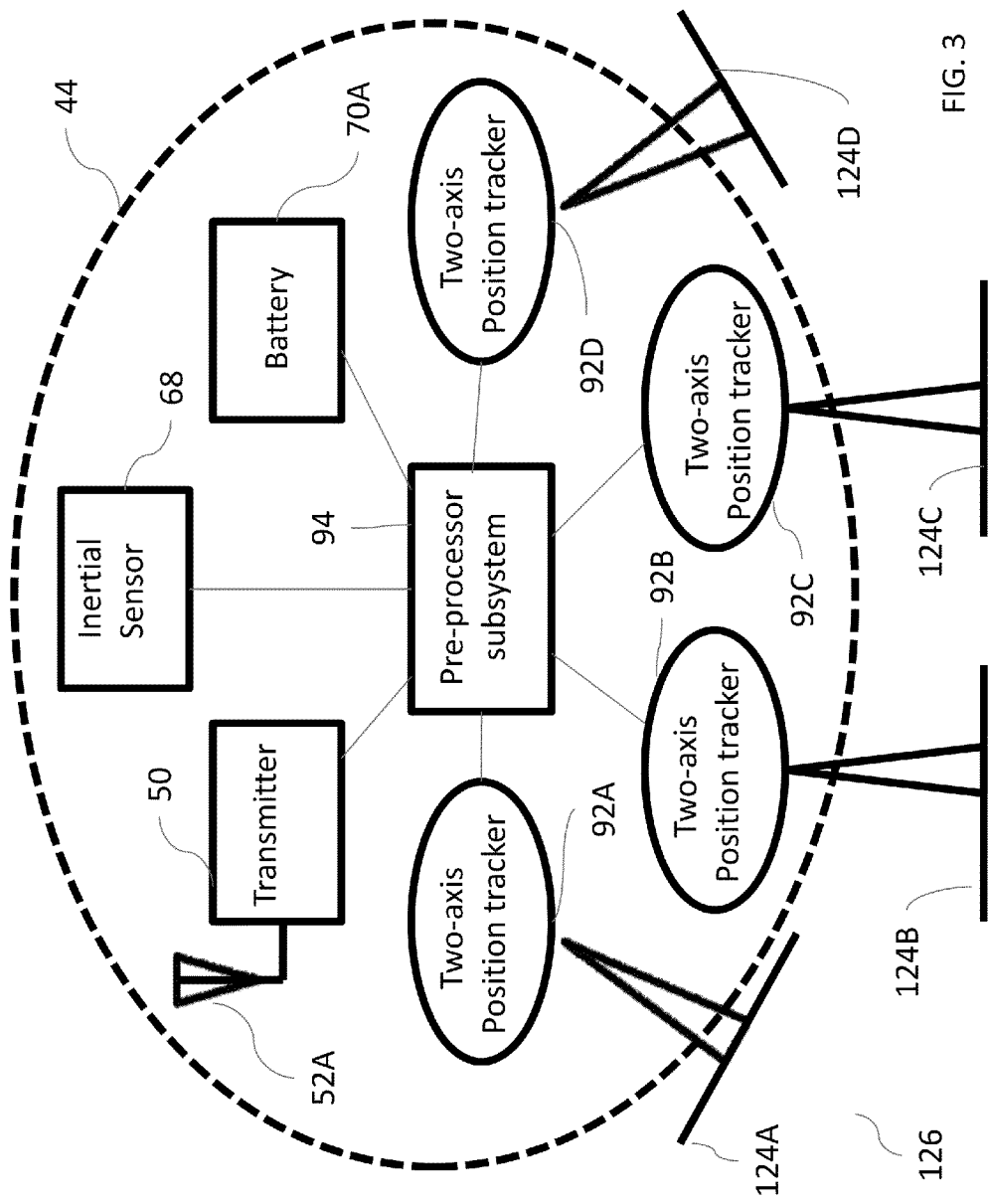
FIG. 3 is a schematic view of one embodiment of the data collection portion of a positioning system of this invention using four anchor point trackers.

FIG. 3 is a block diagram of the components of the data-collection unit 44. One or more two-axes anchor point trackers 92A, 92B, 92C, and 92D are mounted with a predetermined geometry between them. In the preferred embodiment, the two-axes anchor point trackers are evenly distributed on a curved surface to allow for maximum orientability. The two-axes anchor point trackers 92A, 92B, 92C, and 92D are optically linked to their respective anchor points 124A, 1246, 124C, and 124D located in an external reference frame 126.

Tracking data from the two-axes position trackers 92A, 92B, 92C, and 92D are transferred to a pre-processor subsystem 94 via a 3-wire serial peripheral interface (SPI). Data from the pre-processor subsystem 94 is then transferred via the SPI connection to a transmitter 50 which transmits the data wireless via an antenna 52A. In the preferred embodiment a nRF2401 2.4 GHz transceiver is used and the antenna is a PCB trace antenna. The pre-processor subsystem 94 has a power source such as battery 70A. Additionally, an inertial sensor 68 is attached to the pre-processor subsystem 94 via the SPI connection. In the preferred embodiment, the pre-processor subsystem is a PIC 18F2525 microprocessor from Microchip and the inertial sensor is an ADIS16400 from Analog Devices.

Those skilled in the art can appreciate that the number of position trackers 92A, 92B, 92C, and 94D is dependent on the number of degrees of freedom that the moving object 40 of FIG. 2 has relative to the external reference frame 126 of FIG. 3. For a moving object which is free to move in any direction and attitude—six degrees of freedom (x, y, z, roll, pitch, and yaw) at least three two-axes position trackers are required. One skilled in the art can appreciate that additional two-axes position trackers will improve the reliability of the system (in case one of the two-axes position trackers' view is obscured) and also allows the positioning system to move an infinite distance from its starting point by continuously obtaining new anchor points along its path and transferring position detection from the old anchor points to the new anchor points.

Figure 4:
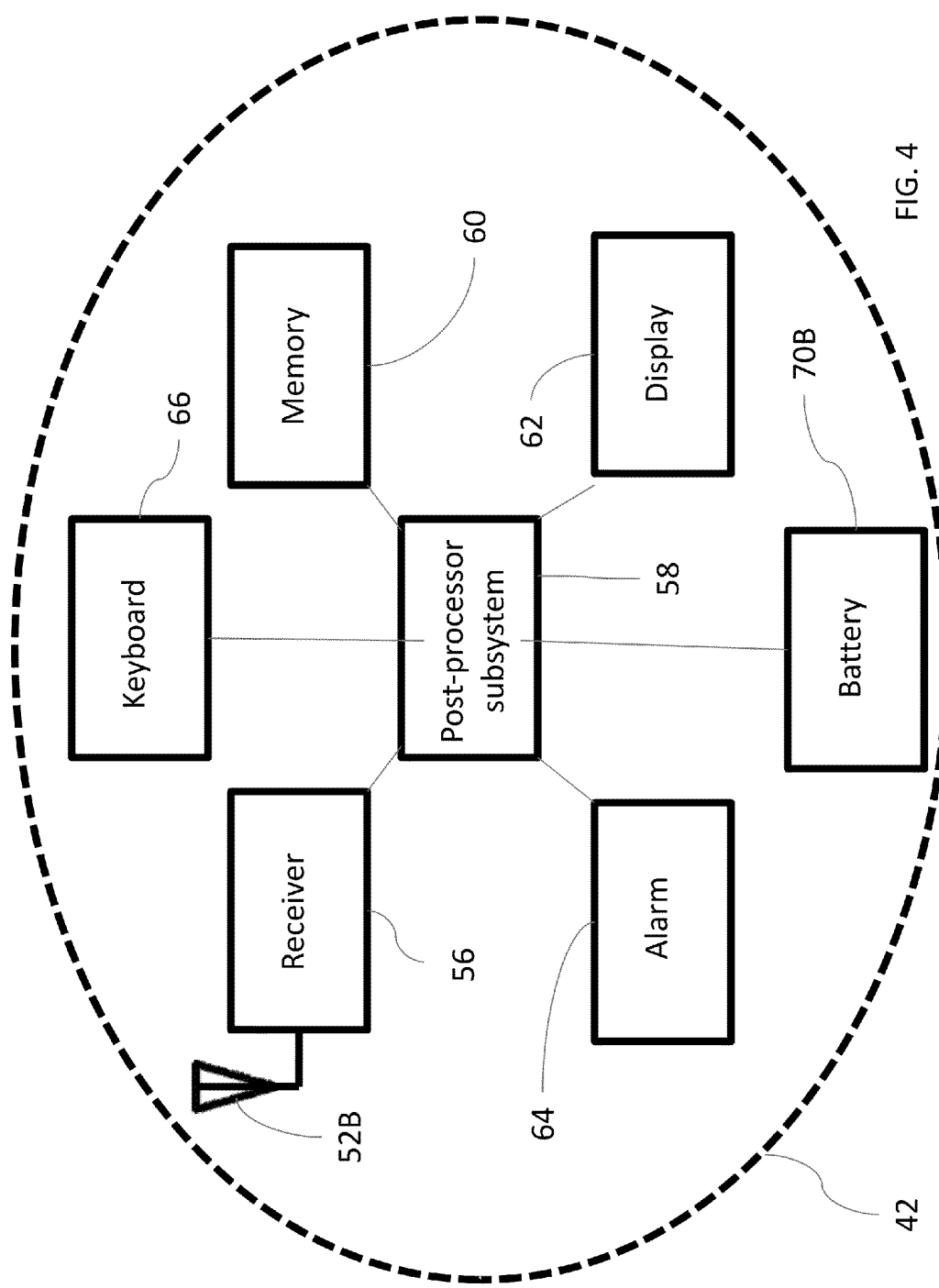
FIG. 4 is a schematic view of one embodiment of the data-processor portion of the positioning system of this invention.

FIG. 4 is a block diagram of the components of the data processing-unit 42. In FIG. 4 the data from the data-collection unit 44 of FIG. 3 is received through an antenna 52B by a receiver 56. The data is transferred via an SPI connection to a post-processor subsystem 58. In the preferred embodiment the receiver is a Nordic nRF2401 and the post-processor subsystem is a PIC 18F2525 microprocessor. Post-processor subsystem 58 is connected to a memory 60 by an SPI connection, to an output device such as a display 62 via the SPI connection and to an alarm 64. In the preferred embodiment the memory is a Flash type non-volatile memory, the display is a two-line by 8 character LCD display, and the alarm is a polyphonic synthesizer chip which drives headphones. An input device such as a keyboard 66, is also attached to the post-processor subsystem 58 through trace connections. Additionally, the post-processor subsystem comprises a power source such as battery 70B.

One skilled in the art can appreciate that data processing can occur in either the pre-processor subsystem 94 or the post-processor subsystem 58.

One skilled in the art can appreciate that the transmitter 50 and receiver 56 could also be transceivers, allowing the post-processor subsystem 58 to send commands to the pre-processor sub-system 94. One skilled in the art can appreciate that the pre-processor subsystem 94 and post-processor subsystem 58 could be the same system, that memory 60 could be integrated with the pre-processor subsystem 94, that display 62 could be integrated with pre-processor subsystem 94 and that alarm 64 could be integrated with pre-processor subsystem 94.

Figure 5:
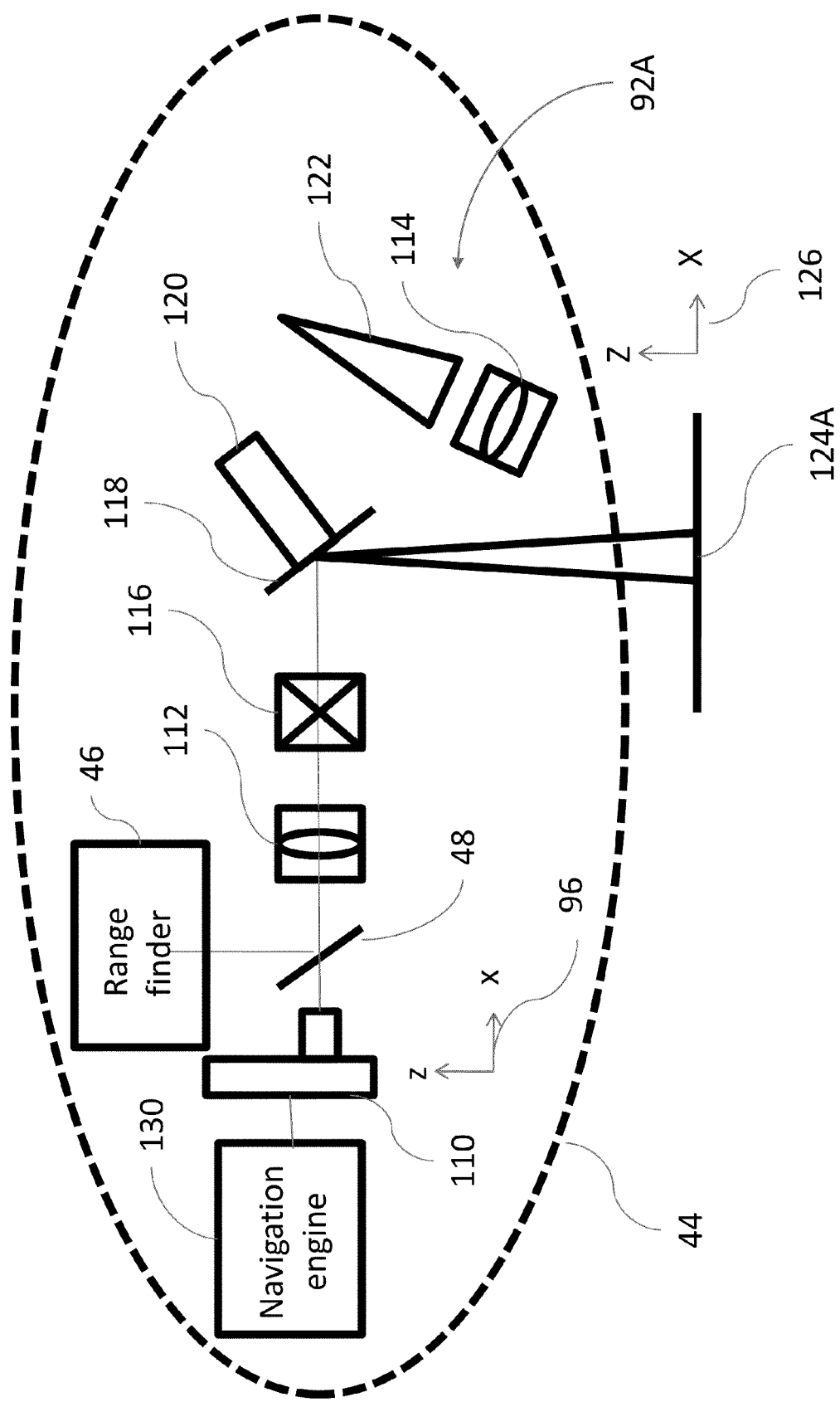
FIG. 5 is a schematic view of one embodiment of an anchor point tracker in accordance with the invention using a miniature gimbaled mirror.

FIG. 5 illustrates the details of the preferred embodiment of one of the two-axes position tracker 92A of FIG. 3. A sensor 110, images the anchor point 124A in the external reference frame 126 through an imaging element 112, that provides both focus and zoom capabilities, an image orientation element 116, and an image path steering element 118 steered by a steering mechanism 120. The steering mechanism 120 is capable of changing the orientation of the image path steering element such that the optical path of sensor 110 can be deviated. By deviating the optical path, the sensor 110 maintains a lock on the anchor point 124A for rotations under +/−90 degrees for roll and pitch and as long as the anchor point can be imaged for x, y, z, and yaw. For the purposes of this description x, y, z, roll, pitch, and yaw are the coordinates in a moving reference frame 96 with x and z as shown in FIG. 5 and y coming directly out of the page. In the moving reference frame 96 roll is rotation around the x axis, pitch is rotation around the y axis, and yaw is rotation around the z axis. In the external reference frame 126 we use X, Y, Z, ROLL, PITCH, YAW, X and Z are as shown in FIG. 5 with Y coming directly out of the page. ROLL, PITCH and YAW have the same relationship to X, Y, Z as roll, pitch, and yaw have to x, y, z.

The sensor 110 is connected to a pattern tracking or navigation engine 130 which detects two-dimensional movement of the image of the anchor point 124A. The pre-processor subsystem 94 of FIG. 3 calculates the amount of movement required by the steering mechanism 120 and controls the movement of the steering mechanism 120.

Beam splitter 48 is inserted in the optical train and directs a part of the image path of the anchor point 124A to a range finder 46 which is capable of determining the distance to the anchor point 124A.

FIG. 5 also shows an optional illumination source 122 and an illumination source control element 114 which could be a collimation lens. Using collimated light could improve the consistency of the image of the anchor point 124A in certain situations.

In the preferred embodiment, sensor 110 is an optical mouse type sensor that uses pattern tracking to determine the x and y shift of the image. An Avago ADNS 2051 is currently the preferred sensor. The navigation engine 130 is included in the same package as the sensor 110 in the Avago device. One skilled in the art can appreciate that there are numerous alternatives to an optical mouse type sensor using pattern tracking including, but not limited to, interferometers (also used in optical mouse sensors) and optical correlation. Additionally, one may use visible light, infrared, ultraviolet, or even radio frequency emissions to track the anchor point 124A. One skilled in the art can appreciate that multiple types of sensor could be employed in the same positioning system (e.g. visible light and infrared) to provide maximum flexibility and accuracy.

One skilled in the art can appreciate that the imaging element 112 can be as simple as a pin-hole to as complex as a motor driven optical train with sensors to detect focus and zoom control to change the size of the anchor point being imaged.

One skilled in the art can appreciate that the optical path steering element 118 could be a mirror, lens, light pipe, fiber optic or other type optical device.

Figure 6:
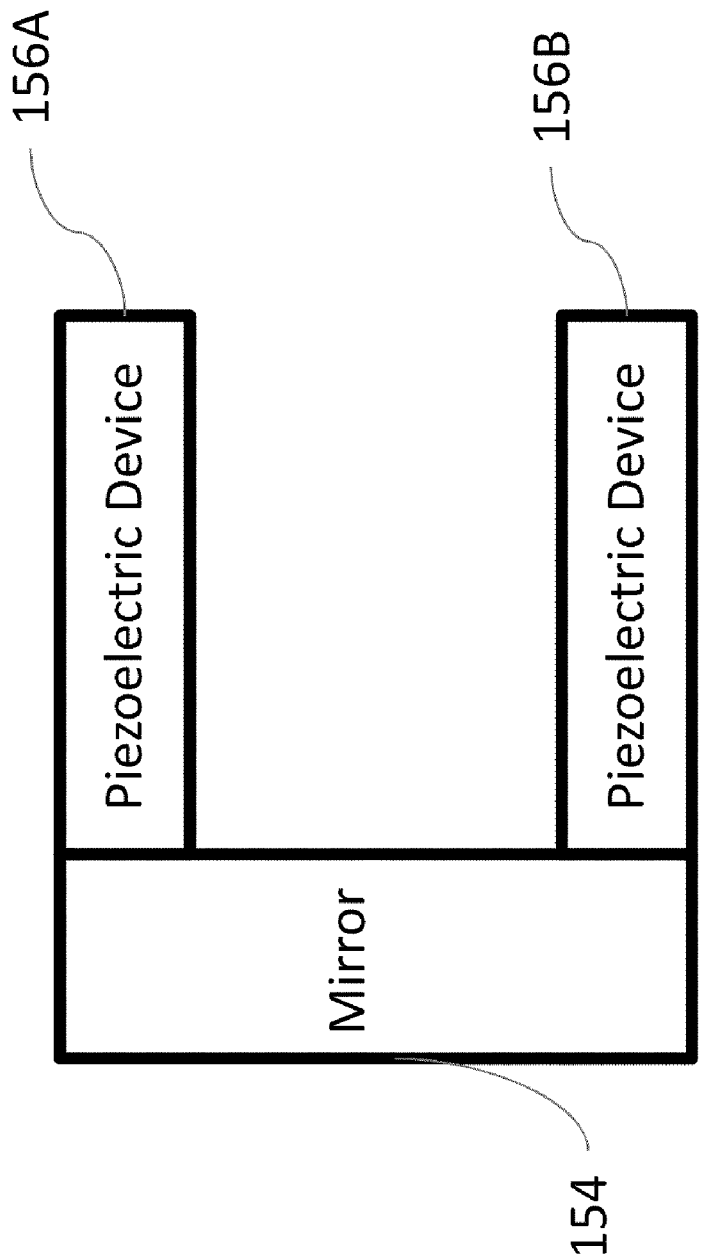
FIG. 6 is a schematic view of an electronically controlled positioner and an associated optical element, such as a mirror (reflective element) or lens (refractive element).

FIG. 6 illustrates the preferred embodiment of the optical path steering element. A micro-machined mirror 154 is positioned by piezoelectric devices 156A and 156B. The mirror is mounted on a mechanism (not shown) that provides two axes of rotation, thus allowing the sensor 110 of FIG. 5 to keep a lock on the anchor point 124A of FIG. 5 within a large range of motion of moving reference frame 96 of FIG. 5.

One skill in the art can appreciate that the positioning devices could be motors, static electricity actuators, electromagnetic devices, etc.

In the preferred embodiment, sensor 110, navigation engine 130, micro-machined mirror 154, and piezoelectric devices 156A and 156B are all fabricated on the same piece of silicon. In the preferred embodiment the entire assembly of FIG. 5 excluding the illumination control element 114 and the illumination source 122 are located in a single integrated circuit.

Operation—FIG. 7-10

Figure 7B:
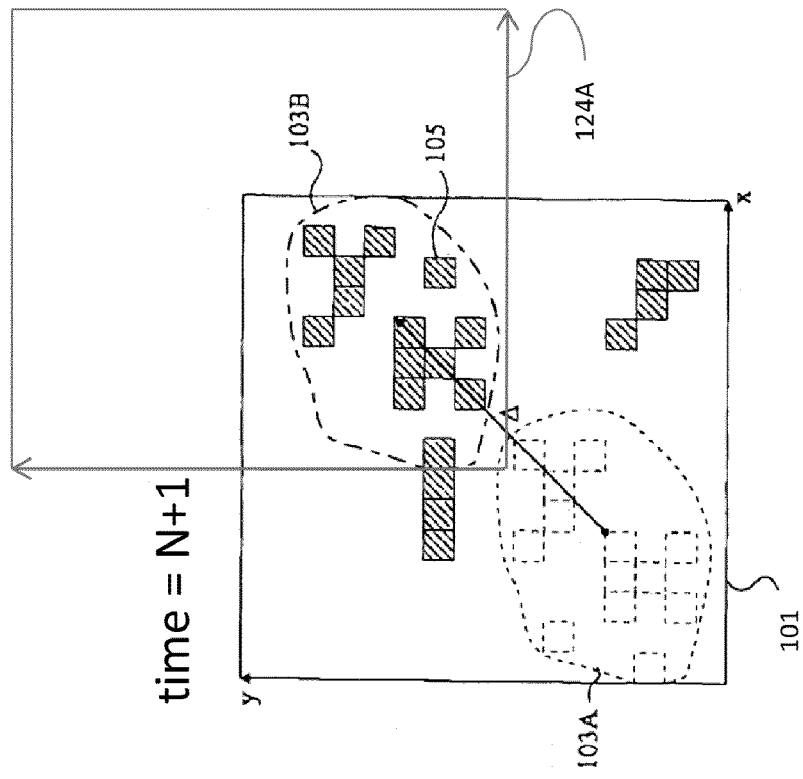
FIGS. 7A and 7B are illustrations of two successive images obtained by an optical navigation engine in accordance with the invention.
Figure 7A:
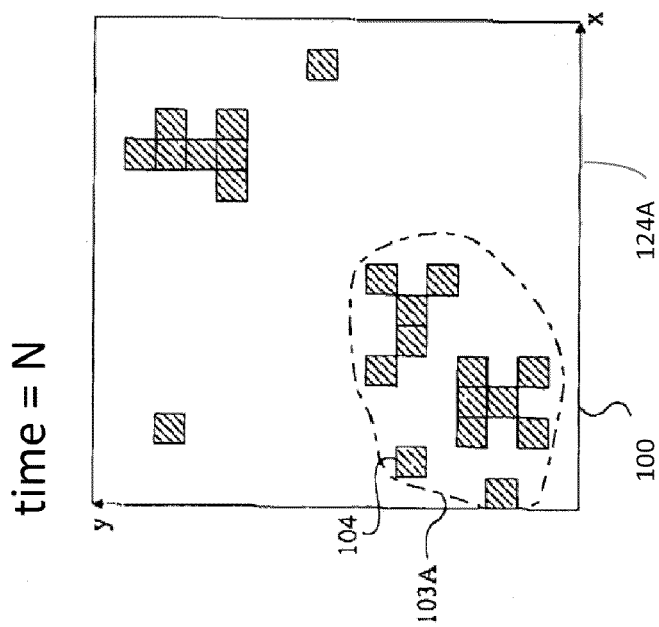

FIGS. 7A and 7B represent two successive images 100 and 101 of the anchor point 124A. For clarity, only black or white pixels have been represented, however the images may be gray scale, color, infrared, ultraviolet, etc. In the initialization process, anchor points are chosen by the software that contain unique trackable characteristics. FIG. 7A shows such a unique trackable characteristic 103A, surrounded by the dashed line, which appears in the anchor point 124A which coincides at time=N with an image frame 100. In FIG. 7B a substantially the same unique trackable characteristics 103B appear in a successive image frame 101. Because the moving reference frame has moved between the two images, the unique visual characteristic 103B that was in the bottom left in the image frame 100, as visual characteristic 103A, now appears in the upper right of image frame 101. It is also possible to have various visual artifacts 104 and 105.

FIG. 7B also shows the pattern 103A in dashed lines. One can see that the movement of the pattern 103A to 103B from one image to the next is characterized by a displacement vector A, with components Ax and Ay. The navigation engine 130 of FIG. 5 calculates the displacement vector while filtering out the artifacts 104 and 105 by using the shift in pixels in the x and y directions.

Figure 8:
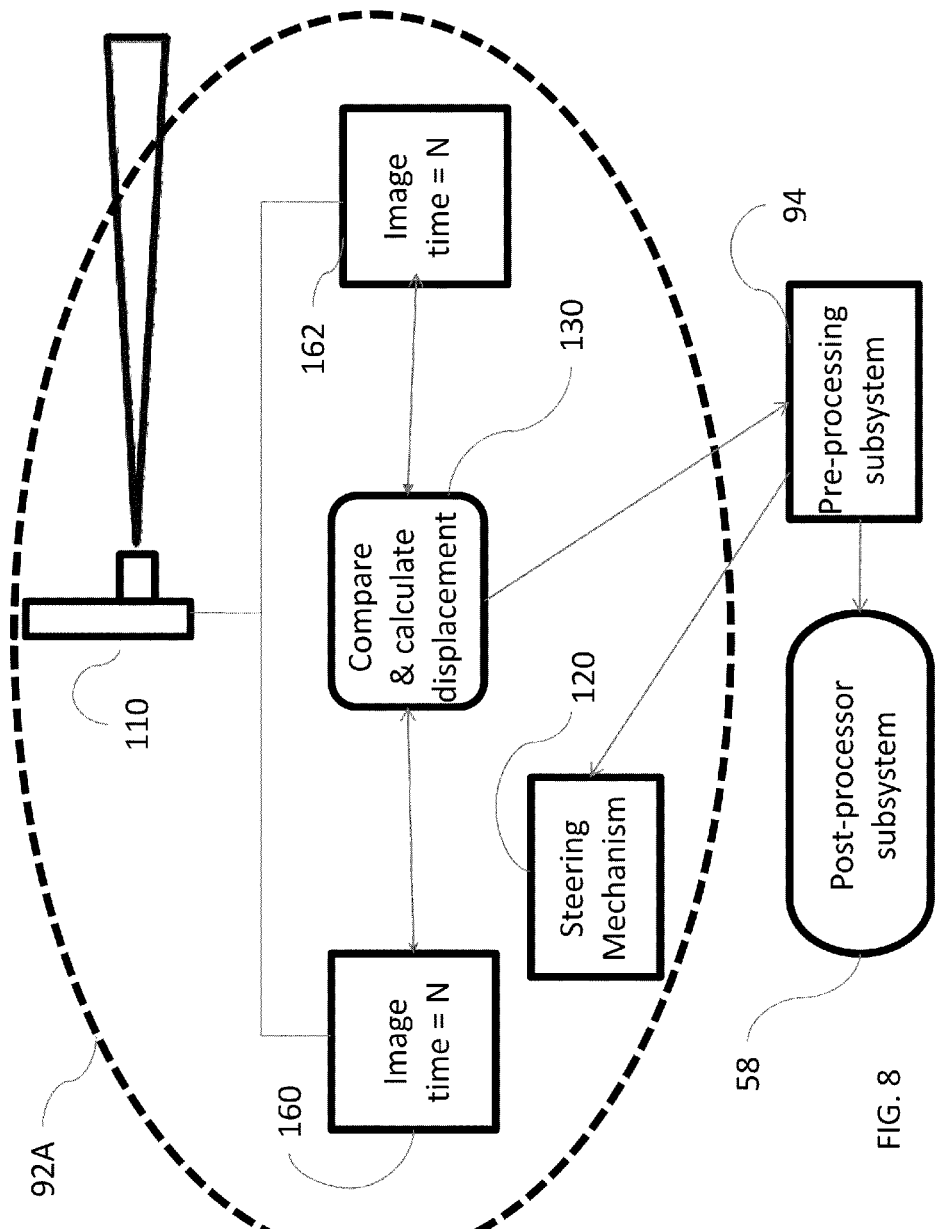
FIG. 8 is a block diagram of the anchor point tracker control software of this invention.

FIG. 8 is a block diagram of the functioning of the two-axes position tracker 92A. Sensor 110 takes an image 160 at time N. The navigation engine 130 stores this image for reference. Sensor 110 then takes a successive image 162 at time N+1. One skilled in the art will appreciate that selection of the time interval must correspond to the speed of the moving frame of reference such that enough of image 160 is also in image 162 to be able to determine the displacement vector between the two images. In the preferred embodiment a ⅔ overlap is desired. The navigation engine 130 compares the two images and determines the displacement of image 162 from image 160. This displacement information is transmitted to pre-processor subsystem 94. Pre-processor subsystem 94 takes the displacement information and combines it with previous displacement information to extrapolate where the anchor point 124A of FIG. 7B will fall within the image frame 101 when the next image at time N+2 (not shown) is taken. The pre-processor subsystem 94 than calculates the two angles of rotation $\phi$ and $\psi$ required to re-center the anchor point 124A of FIG. 7A within image frame 100 of FIG. 7A. This process creates a geometrical link between the two-axes position tracker 92A and the anchor point 124A defined by the two angles of rotation $\phi$ and $\psi$. This information is then transmitted to steering mechanism 120 to adjust the orientation of the optical path steering element.

One skilled in the art will appreciate that in steady state translation, rotation, or acceleration, the predicted location of the anchor point 124A of FIG. 7A will remain centered within image frame 100. When the rate of translation or rotation changes, additional corrections will be required to bring anchor point 124A back into image frame 100. One skilled in the art will appreciate that with currently available high-speed sensors (sensors are currently available that take greater than 6000 images a second) it is possible to design a system that will detect and correct changes in the rate of translation and rotation before the anchor point 124A drifts more than a few pixels away from being centered in image frame 100.

Pre-processor subsystem 94 also transmits the angular changes $\phi$ and $\psi$ to post-processor subsystem 58. The post-processor subsystem 58 takes the angular data from one or more 2-axes position trackers to compute a new position X, Y, Z, ROLL, PITCH, and YAW. For a system with 3 independent position trackers capable of tracking 6 degrees of freedom post-processor subsystem 58 solves the following 9 simultaneous equations with 9 unknowns:

$$APi = A + R*(Si + di*Fi) \quad (EQ.1)$$

Where (reference numbers refer to FIG. 5 unless otherwise noted):

APi=location of anchor point i in X, Y, Z (for a system with 3 position trackers APi=AP1, AP2, and AP3 and each APi consists of 3 points X, Y, and Z). These data points are known after the calibration procedure.

A=location of sensor array, in the external reference. This is the offset of the origin of the rotated moving reference frame 96 from the origin of the external reference frame 126. It consists of a delta X, delta Y, and delta Z. These three variables are calculated.

R=a rotation matrix (3 by 3) depending on roll, pitch, and yaw (of the moving reference frame 96). There are three unknowns, roll, pitch, and yaw.

Si=the location of sensor i in the moving frame of reference 96. This is the offset of the image path steering element 118 relative to the origin of the moving reference frame 96 in x, y, z. Si is known from the geometry of each 2-axes position tracker.

di=distance from sensor i to anchor point i. These three unknowns are calculated.

Fi=a simple function of the 2 angles $\phi$ and $\psi$ used to aim sensor i at anchor point i.

One skilled in the art can appreciate the many available algorithms that solve 9 simultaneous equations with 9 unknowns numerically.

Figure 9A:
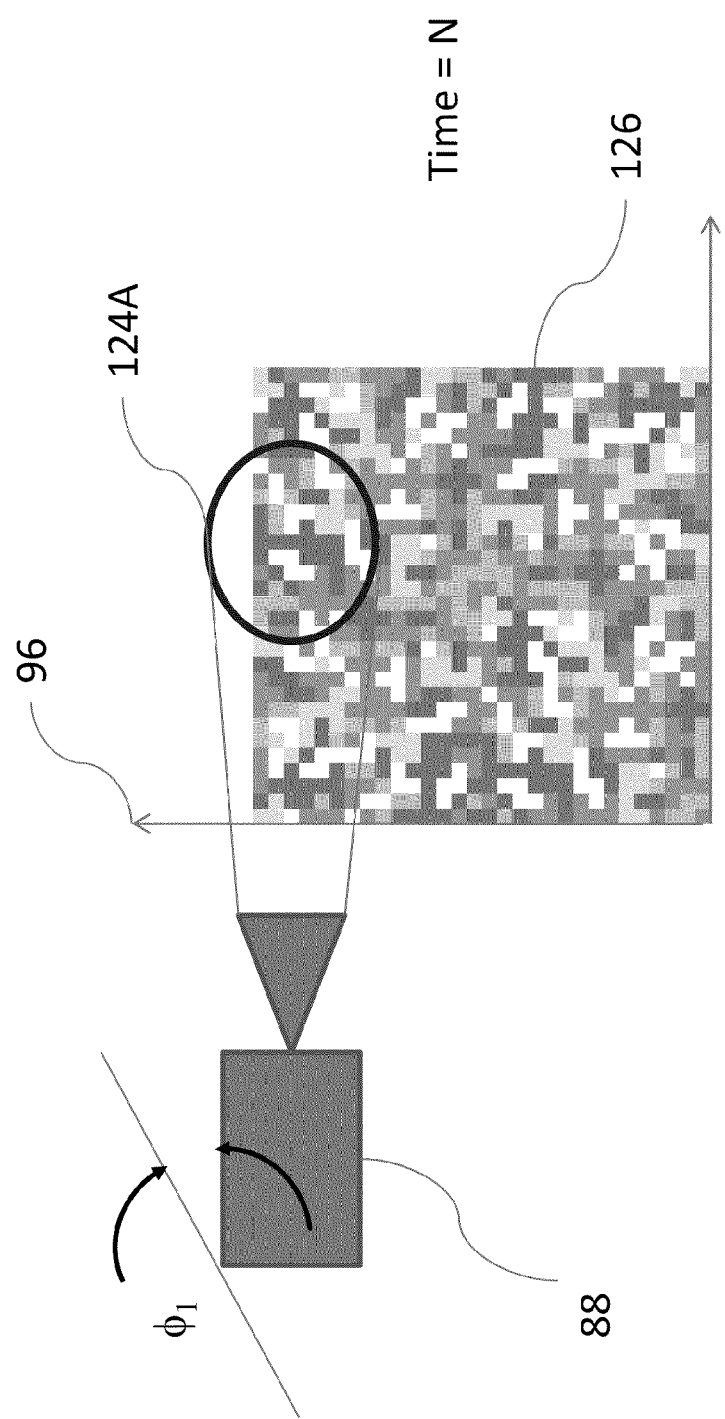
FIGS. 9A-9C are 2D illustrations of the operation of the anchor point tracker.
Figure 9B:
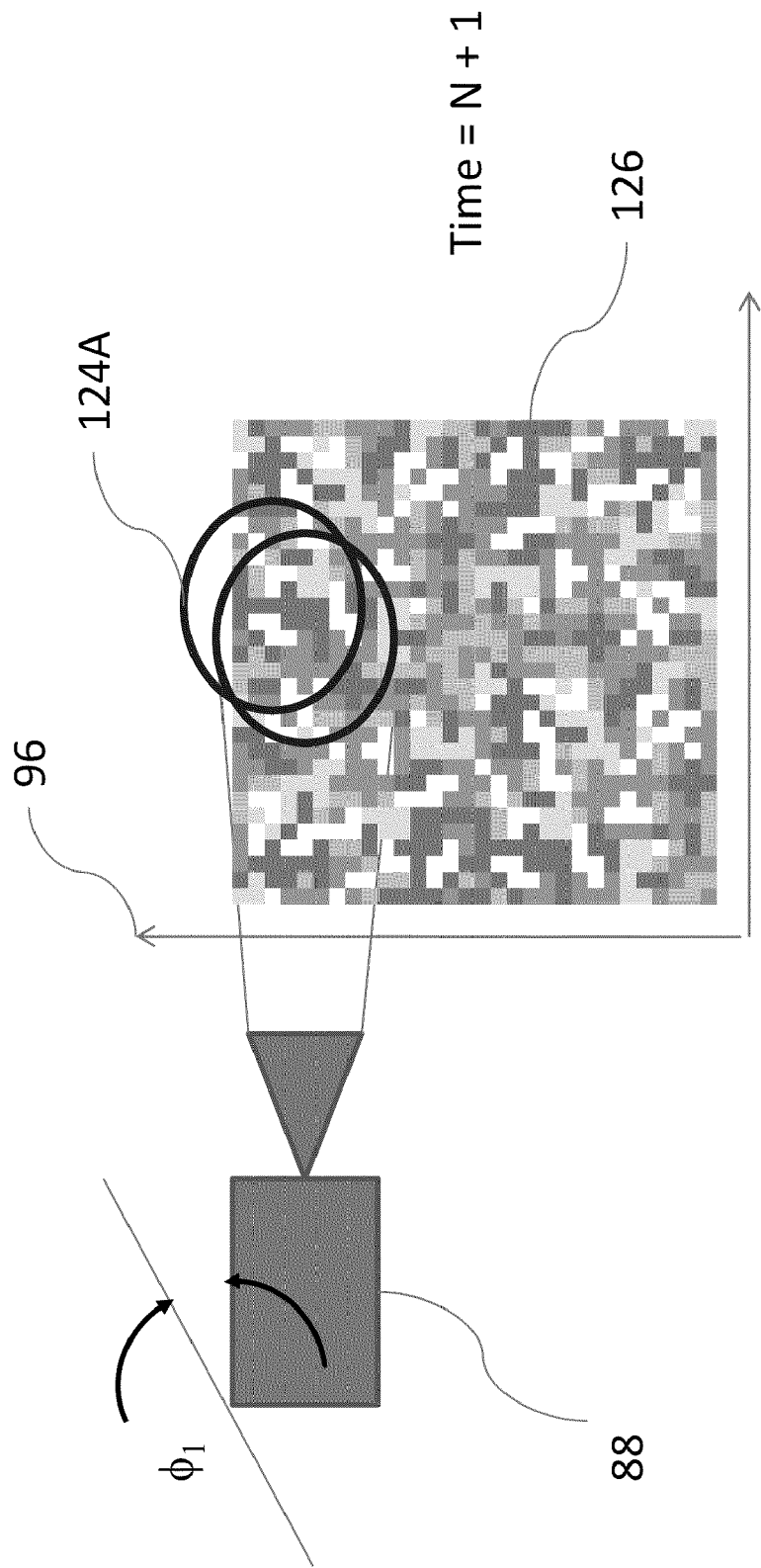
Figure 9C:
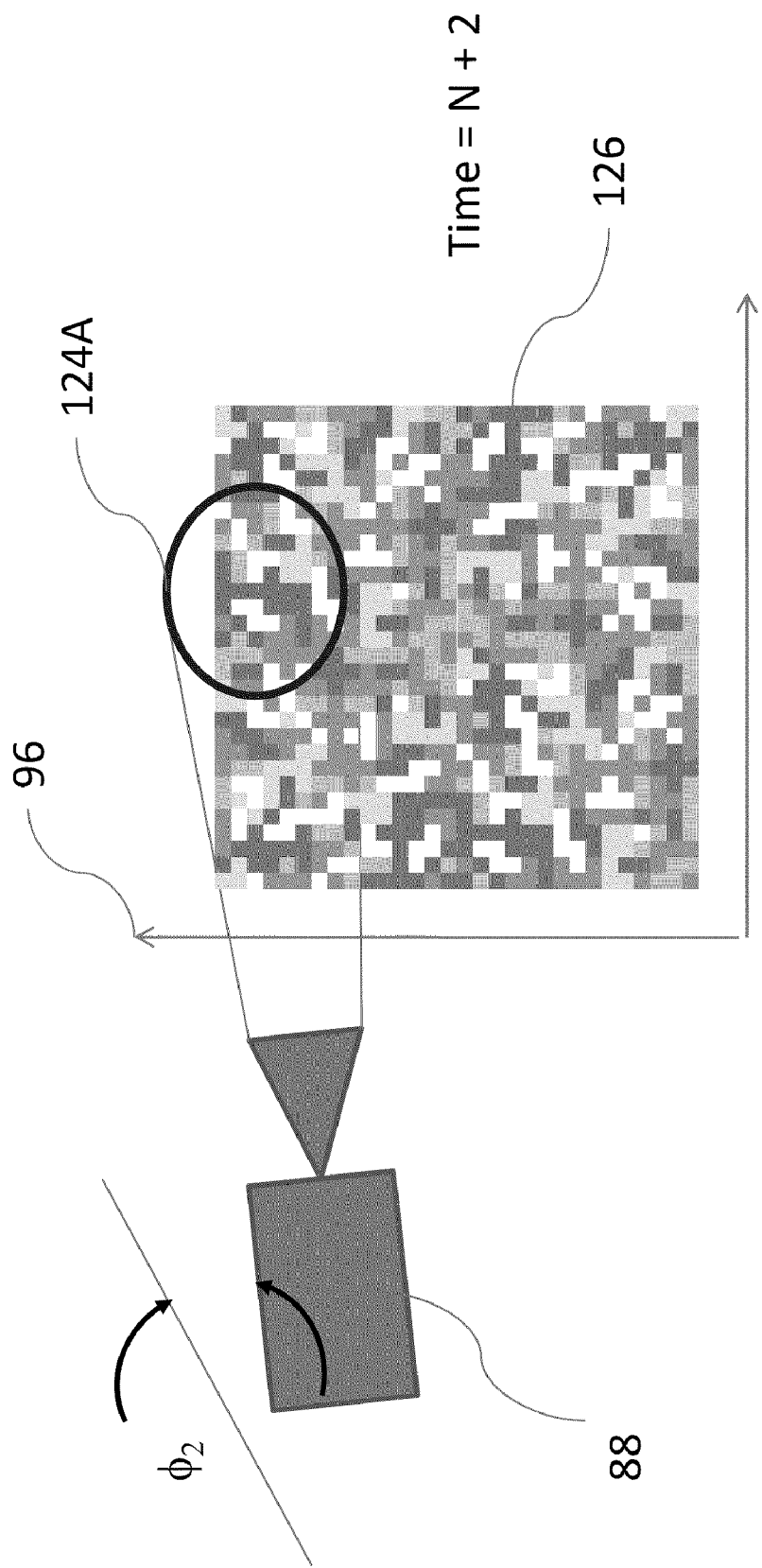

FIGS. 9A, 9B and 9C are a simplified representation detailing how the anchor point tracker 92A of FIG. 5 tracks the anchor point 124A. For simplicity, these figures combine the sensor, optical train and steering mechanism into one element a consolidated anchor point tracker 88 and only show one angle of rotation of the anchor point tracker 88. One skilled in the art will appreciate how one would implement two axes of rotation. In FIG. 9A at time=N, the anchor point tracker 88 is locked onto anchor point 124A. In FIG. 9B at time=N+1 the image taken by the anchor point tracker 88, which is in the external reference frame 126 appears to shift relative to the moving reference frame 96. Anchor point tracker 88 detects this shift, which it transmits to the pre-processor subsystem, which predicts the next location of the anchor point 124A and in turn corrects the alignment of the anchor point tracker 88, such that at time N+2 the anchor point tracker is again pointing to the original point (see FIG. 9C). Note that between FIGS. 9B and 9C, the image in the external reference frame 126, continues to shift relative to the moving reference frame 96, whereas the anchor point tracker 88 is re-adjusted to center the anchor point 124A at the predicted position at time=N+2. The predictive algorithm adjusts one time period ahead using the trajectory of the moving reference plan 96 relative to the external reference frame 126. As long as the trajectory stays constant, the anchor point tracker 88 stays locked onto the anchor point 124A.

When the trajectory of the moving reference frame 96 changes, one additional correction step is required.

Note that the anchor point 124A is slightly rotated relative to the moving reference frame 96. The preferred sensor is tolerant of slight rotational changes, however, the orientation element 116 of FIG. 5 can also be used to correct rotation.

One skilled in the art will appreciate the many algorithms available for predictive tracking.

Figures 10A, 10B:
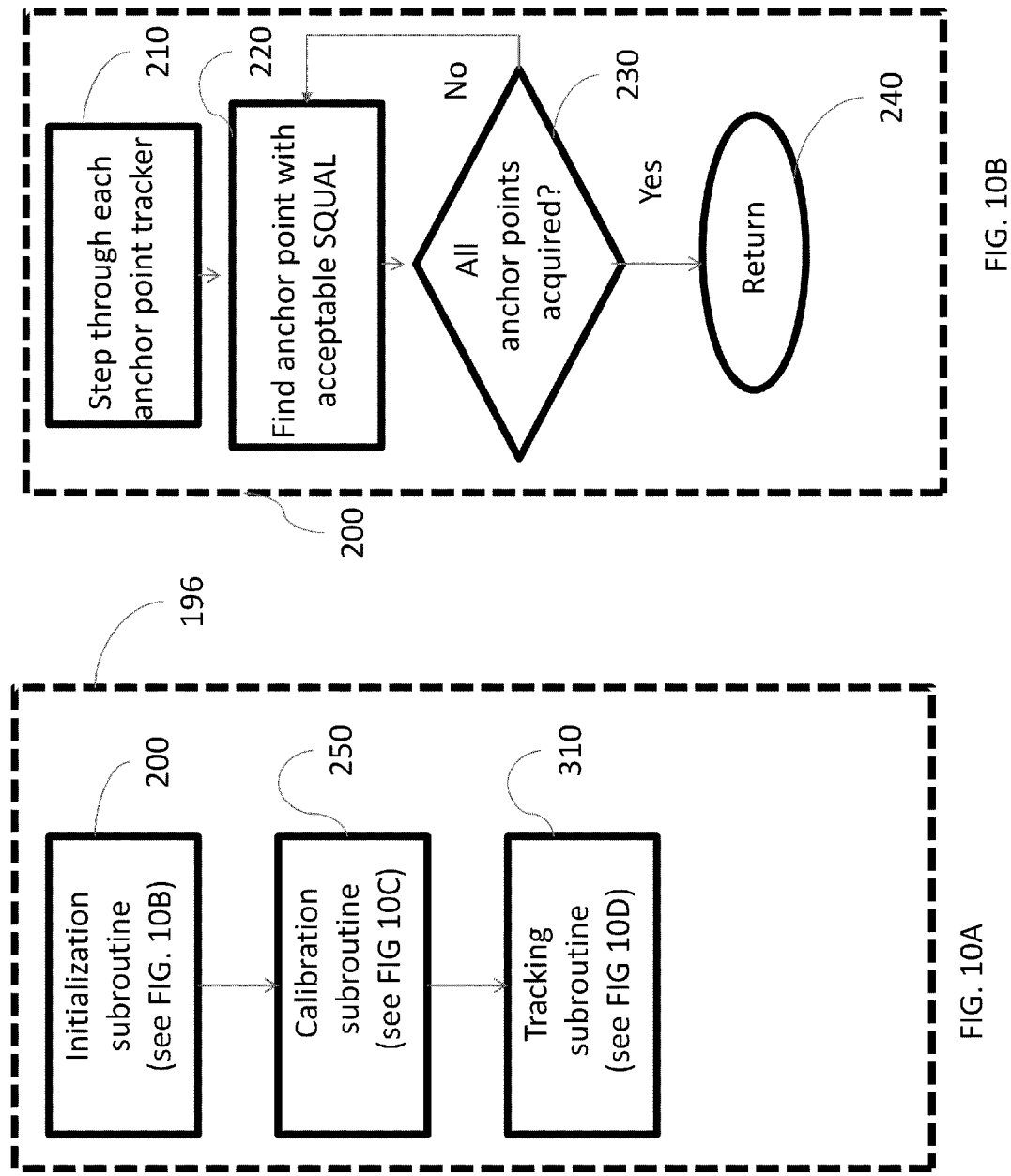
FIGS. 10A-10D are flow charts of the main control software of this invention.
Figure 10C:
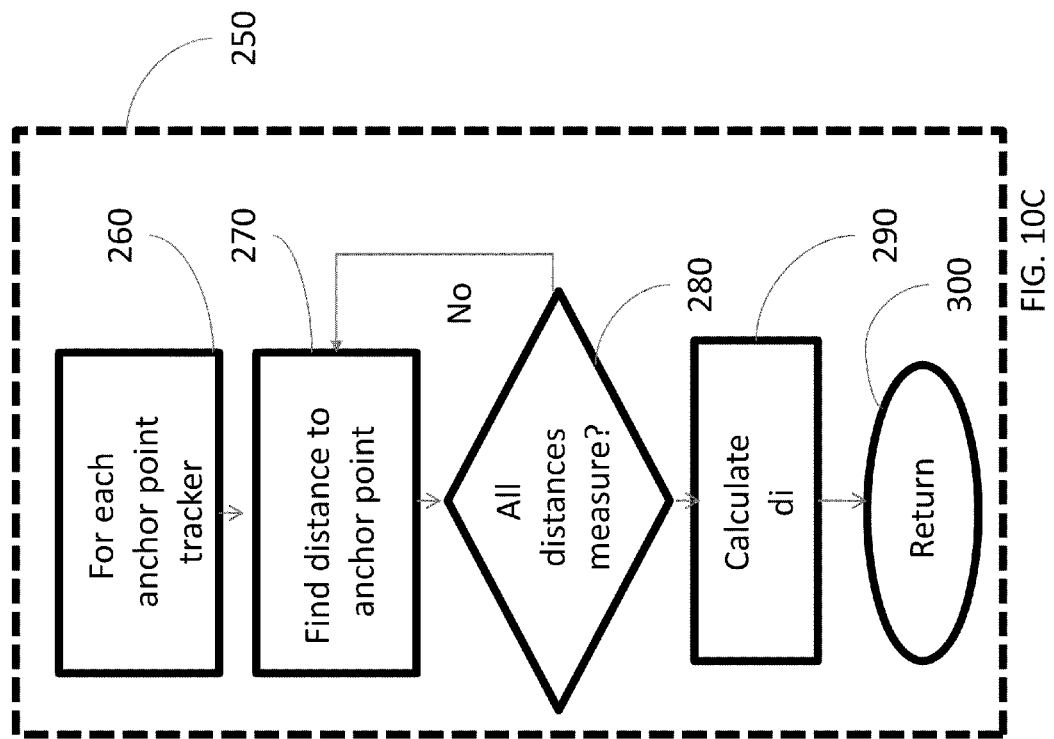
Figure 10D:
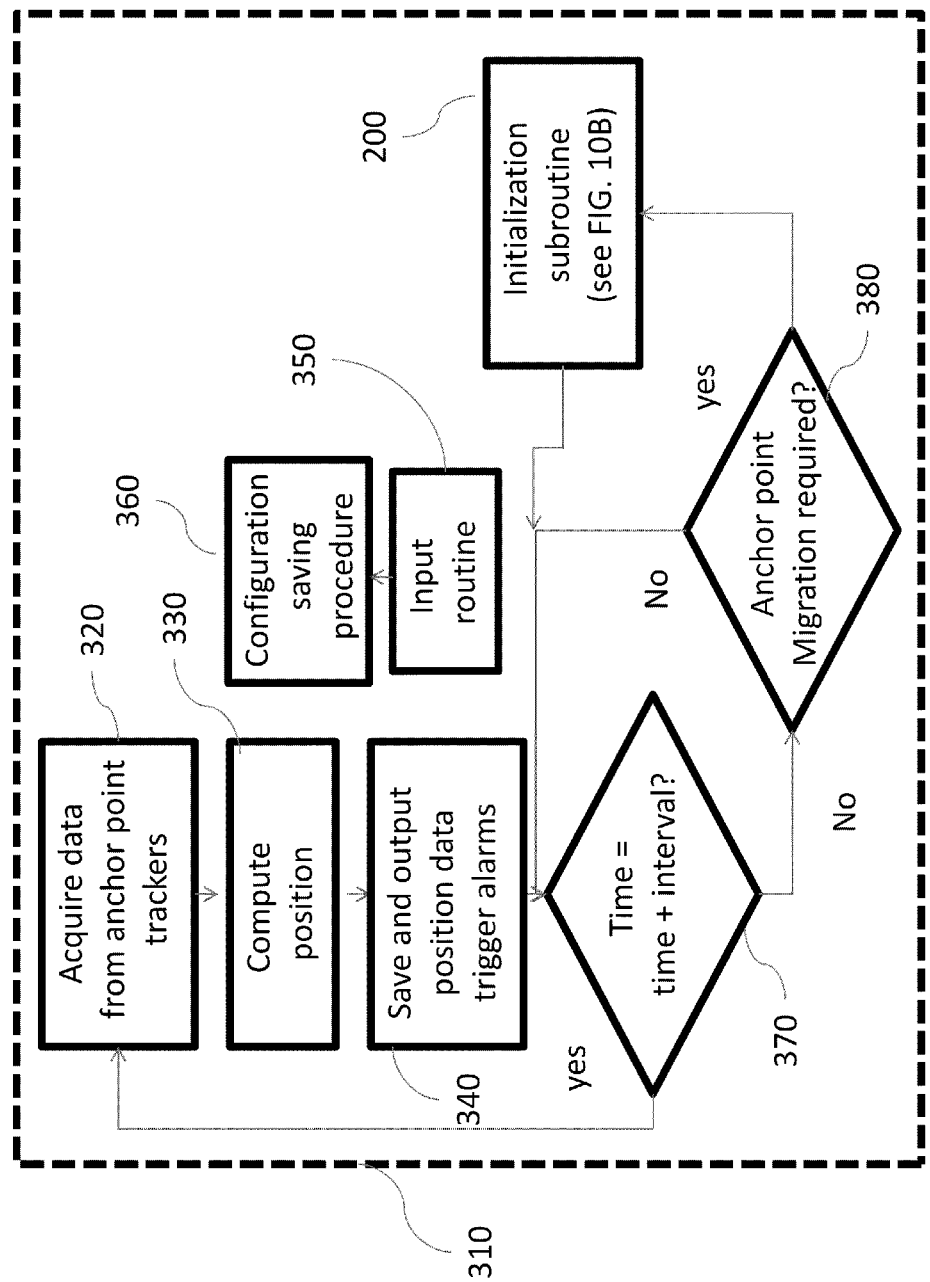

Software Flow-Chart: Initialization, Calibration, Tracking, and Anchor Point Migration—FIGS. 10A-10D FIGS. 10A-10D are flow charts of the initialization, calibration, and continuous operation of the positioning system. FIG. 10A shows a main program 196 of the software while FIGS. 10B-10D show the subroutines.

Initialization

In FIG. 10A when the system is turned on, the individual anchor point trackers have not yet acquired anchor points. The first step is for the anchor point trackers to acquire anchor points that are geographically separated and provide the necessary image quality for tracking. The tracking quality of an image is known in the art as surface quality or SQUAL and is a feature of the available optical navigation sensors. This is done in an initialization subroutine 200.

The steps within the initialization subroutine 200 are shown in FIG. 10B. The software steps through each anchor point tracker in an anchor point stepper subroutine 210. Each anchor point tracker scans the surfaces in a quadrant of the external reference frame in a scanning routine 220 analyzing the SQUAL. Upon finding a point with acceptable SQUAL for the selected anchor point tracker, the software checks to see if additional anchor points are required in a decision subroutine 230. If all anchor points are found the initialization subroutine 200 returns control to the main program 196 of FIG. 10A in a return subroutine 240.

In the preferred embodiment, one or more redundant anchor point trackers are incorporated in the system (e.g. 5 anchor point trackers for tracking 6 degrees of freedom provide two redundant anchor point trackers). The data from the redundant anchor point trackers are used to improve the quality of the data and to maintain positioning continuity when anchor points must be migrated (see discussion below on anchor point migration).

Calibration

Once anchor points are acquired, the geometry of the initial anchor points needs to be ascertained. As can be seen from EQ. 1, to reduce the system to 9 equations with 9 variables, the geometry of the 3 anchor points within the external reference frame must be known. A calibration subroutine 250 of FIG. 10A performs this function.

At initialization, the origin and orientation of the moving reference frame is the same as the origin and orientation of the external reference frame (x=X=0, y=Y=0, z=Z=0, roll=ROLL=0, pitch=PITCH=0, and yaw=YAW=0). This reduces EQ. 1 to:

$$APi = Si + di * Fi \quad (EQ. 2)$$

Si which is known from the geometry of the two-axes image trackers and Fi is a function of $\phi$ and $\psi$ from the pre-processor subsystem 94 of FIG. 3. The system needs to find di, the distance between the sensor and the anchor point in order to calculate the coordinates of each anchor point APi.

In FIG. 10C, a for-each-tracker subroutine 260 steps through each anchor point tracker. A distance detecting subroutine 270 controls the range finder 46 in the preferred embodiment of FIG. 5 which measures the distance between the sensor and the anchor point APi. A control block 280 verifies that the distance is found between all anchor point trackers and their associated anchor points APi. A calculation routine 290 uses EQ. 2 to calculate each di for each anchor point tracker. Control is then returned to the main program of FIG. 10A via a return routine 300.

An alternative embodiment uses the inertial sensor 68 of FIG. 3 to determine the location of the anchor points. The inertial sensor accurately detects movement of the data-collection unit for short periods of time. Uses EQ 1 and the acceleration data of the inertial sensor, permits one to determine the location of the anchor points.

Tracking

Once the initial anchor point APi coordinates are identified, the software branches to a tracking subroutine 310 of FIG. 10D.

In FIG. 10D, a data acquisition subroutine 320 acquires data from the navigation engines of each of the anchor point trackers. A computational subroutine 330 performs the math to determine the position and attitude of the positioning system. A save and output routine 340 saves the position data, outputs the position data to the output device such as a display, and triggers any alarms based on the position.

The user can interact with the system via an input routine 350 which allows the user to configure the position tracker with information such as recording rate, alarm thresholds, or predefined offsets of the fixed coordinate system from the initial location, and the user's settings are saved via a configuration saving procedure 360.

A timer 370 triggers a new set of samples at the appropriate intervals.

Anchor Point Migration

As the positioning system translates and rotates, it is possible that one or more of the position trackers lose the ability to follow one or more of the anchor points. This could occur because of obstacles between the position tracking and the anchor point or could be due to the change in location of the position tracking that gets too far from the original position to be able to track the original anchor point or that rotates in such a manner as the original anchor points no longer fall in the range of motion of the steering mechanism. An anchor point migration routine 380, tracks the anchor points and detects when an anchor point is close to or has lost its ability to stay locked onto an anchor point. If an anchor point must be migrated, the anchor point migration routine calls the initialization subroutine 200 for the anchor point tracker in question and reinitializes that anchor point.

Usage

Figure 11B:
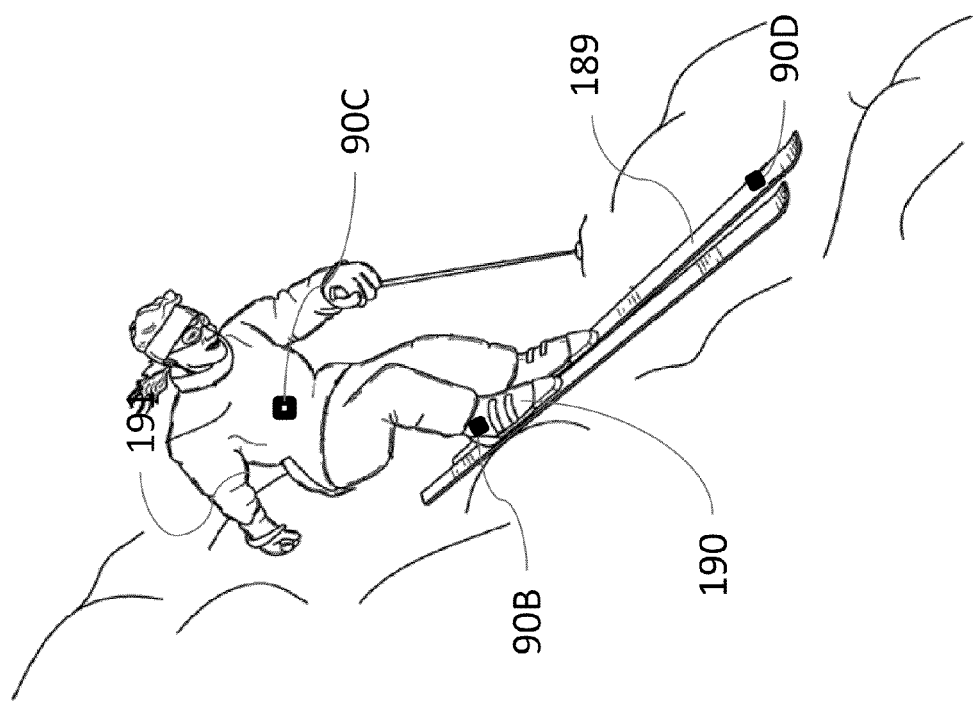

FIGS. 11A-11G show how the position tracker of this invention might be used to track the displacement of a moving object that is free to move with 6 degrees of freedom. FIG. 11A illustrates a positioning system 90A in accordance with this invention mounted on a golf club 192. FIG. 11B illustrates a positioning system 90B in accordance with this invention mounted on a ski boot 190. FIG. 11B also illustrates a positioning system 90C mounted to the skier 191 and a positioning system 90D mounted to a ski 189.

Figure 11C:
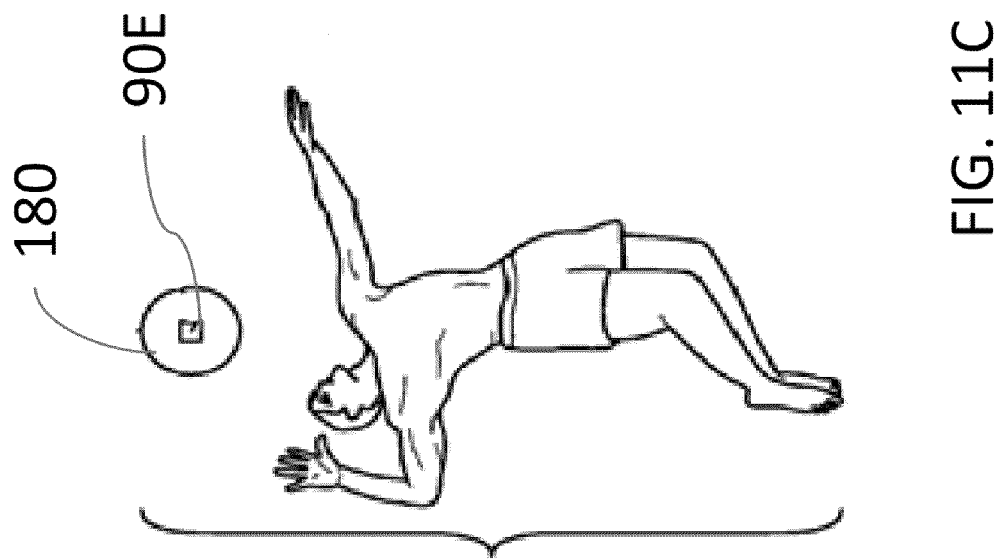
Figure 11D:
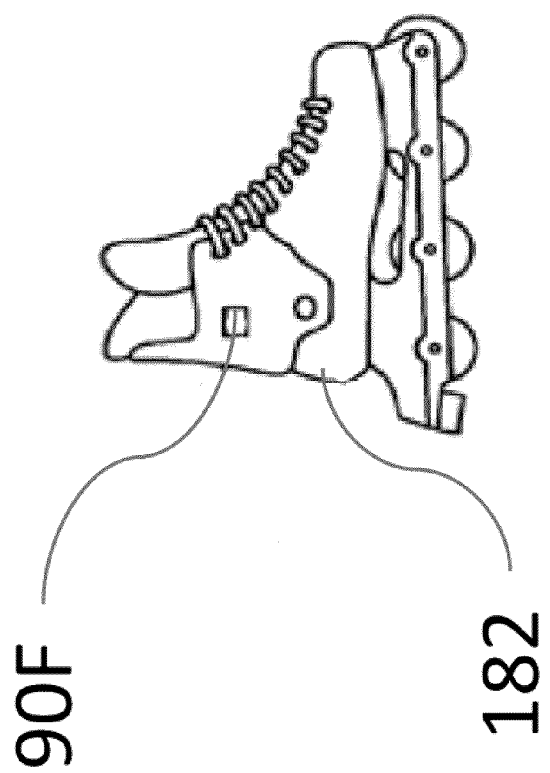
Figure 11F:
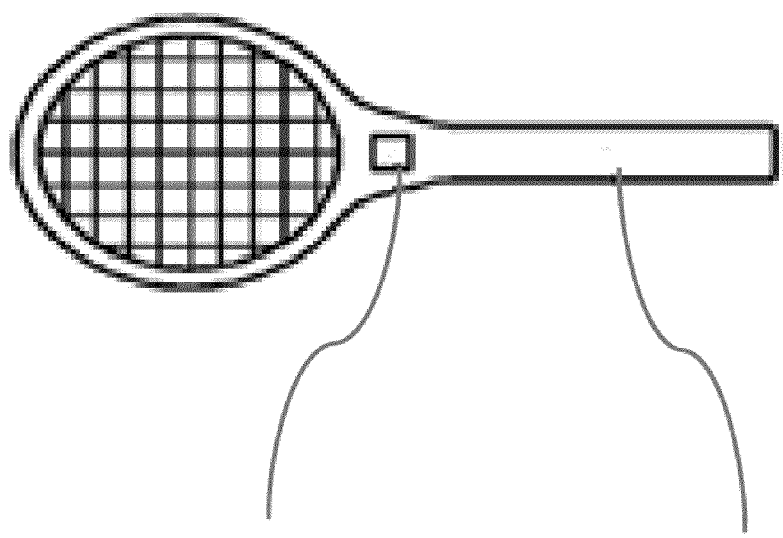
Figure 11G:
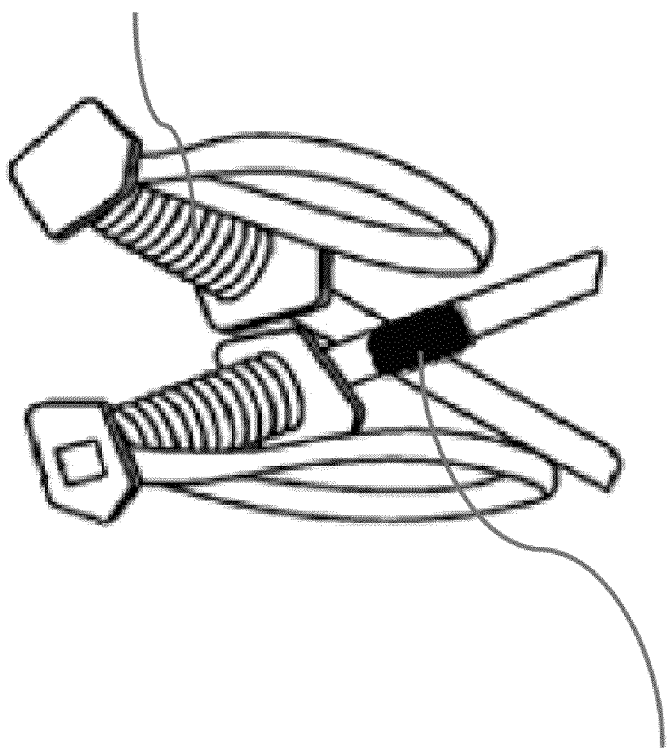

FIG. 11C illustrates a positioning system 90E in accordance with this invention mounted in a ball 180. FIG. 11D illustrates a positioning system 90F in accordance with this invention mounted on a skate 182. FIG. 11E illustrates a positioning system 90G in accordance with this invention mounted on a skateboard 186. FIG. 11F illustrates a positioning system 90H in accordance with this invention mounted on a racket 184. FIG. 11G illustrates a positioning system 90J in accordance with this invention mounted on a ski pole 188. In addition to the above examples one skilled in the art can envision using the positioning system in video and computer game consoles, industrial controls, robots, terrestrial vehicles, airborne vehicles, etc.

Alternative Embodiments

Figure 12:
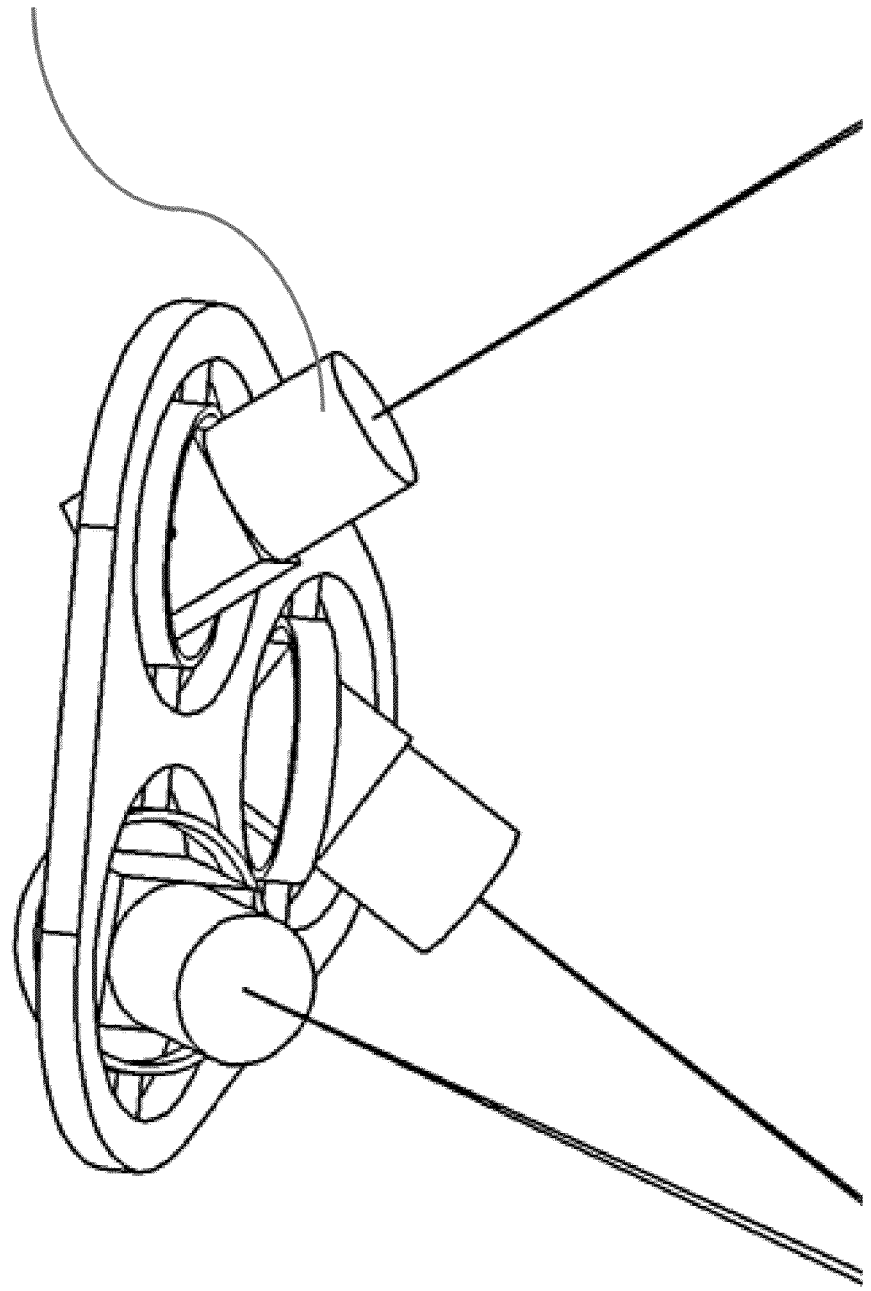
FIG. 12 is a schematic view of another embodiment of the positioning system in accordance with the invention.

FIG. 12 illustrates an alternate embodiment where a gimbaled aiming element 54 is used to position an optical element such as a light pipe, fiber optic device, prism, or the entire optical train.

Advantages

From the description above, a number of advantages of the positioning system of this invention become evident:

(1) the position (x, y, z) and attitude (roll, pitch, and yaw) of a moving object within an external reference frame can be determined to a higher level of accuracy than is possible with existing systems like GNSS. By selecting the appropriate anchor points, sub-millimeter accuracy is possible relative to the 10 cm accuracy of the very best GNSS systems and the >1 m accuracy of standard GNSS systems that do not require base stations.

(2) the position and attitude of a moving object can be determined without a fixed infrastructure of transmitters, targets, or other devices, making the system highly portable and tolerant to environmental interference, like mountains or buildings, that can block GNSS signals.

(3) the position and attitude of the moving object can be determined without a physical connection to the external reference frame.

(4) the position and attitude of the moving object is determined from absolute measurements which virtually eliminates issues related to random walk and drift issues associated with accelerometers and gyroscopes.

CONCLUSION, RAMIFICATIONS, AND SCOPE

Accordingly, the reader will see that the positioning system of this invention provides accurate position and attitude of a moving object, with a high level of accuracy, is tolerant of many types of environmental interference, does not require a pre-installed infrastructure, and does not experience drift issues associated with other systems.

Furthermore, the positioning system of this invention has the additional advantages in that:

the two-axes anchor point trackers of this invention can be fabricated in a single integrated circuit that is small in size and can be easily incorporated into other devices the two-axes anchor point trackers of this invention can be located in different orientations and at different distances from each other to provide a maximum of flexibility to monitor position and attitude of a wide variety of moving objects the two-axis anchor point trackers of this invention can be used independently for systems with 2 degrees of freedom, or can be combined in multiples to be adapted to the number of degrees of freedom being measured and the characteristics of movement that is being measured the two-axes anchor point trackers of this invention, fabricated in a single integrated circuit, have low power consumption and thus can be operated from small highly portable batteries.

Although the description above contains many specificities, these should not be construed as limiting the scope of the invention but as merely providing illustrations of some of the presently preferred embodiments of this invention. It will be apparent to one skilled in the art that the invention may be embodied still otherwise without departing from the spirit and scope of the invention.

Thus the scope of the invention should be determined by the appended claims and their legal equivalents, rather than by the examples given.

I claim:

1. A method for determining the location and attitude of a moving object relative to an external reference frame, comprising the steps of:
    providing an optical pattern detector for detecting a unique pattern in said external reference frame;
    providing a navigation engine coupled to said optical pattern detector for computing displacement of said unique pattern in said external reference plane;
    providing an optical path steering element for deviating the optical path of said optical pattern detector;
    providing a steering mechanism for controlling said optical path steering element;
    providing a control means for computing the required adjustment to said steering element based on data from said navigation engine and adjusting said optical path steering mechanism to keep said unique pattern visible to said optical pattern detector while the physical orientation of said pattern detector changes with respect to said external reference frame;
    providing a computational means for computing the location and attitude of said moving object using data obtained from said control means.

2. The positioning system of claim 1, further providing range finder for determining the distance from said moving object to a point in said external reference frame.

3. The positioning system of claim 1, further providing an inertial sensor, for measuring linear and rotational accelerations.

4. The positioning system of claim 1, further providing a mirror for deviating said optical path of said pattern detector.

5. The positioning system of claim 1, further providing a piezoelectric actuator for actuating said steering mechanism.

6. A positioning system for measuring the location and attitude (roll, pitch, and yaw) of a moving object relative to an external reference frame comprising:
    a means of tracking a unique pattern in said external reference frame;
    a means of deviating the optical axis of said means of tracking;
    a means of controlling said means of deviating the optical axis to said unique pattern substantially centered in the image frame of said means of tracking while the physical orientation of said means of tracking changes with respect to said external reference frame;
    and a computational means for converting the orientation of said means of deviating the optical axis into location and attitude of said moving object relative to said external reference frame.

7. The positioning system of claim 6, wherein said means of tracking a unique pattern comprises an optical mouse type pattern tracking sensor.

8. The positioning system of claim 6, wherein said means of tracking a unique pattern comprises a laser interferometer.

9. The positioning system of claim 6, further comprising a range finder.

10. The positioning system of claim 6, further comprising an inertial sensor.

11. The positioning system of claim 6, further comprising a mirror.

12. The positioning system of claim 6, further comprising a piezoelectric actuator.

13. A positioning system for measuring the location and attitude of a moving object relative to an external reference frame comprising:
    a sensor for detecting a unique pattern in said external reference frame;
    a navigation engine for computing a displacement of said unique pattern in said external reference frame relative to said moving object;
    an optical path steering element for deviating the optical path of said sensor;
    a steering mechanism to control the orientation of said optical path steering element;
    and a computational means for controlling said steering mechanism using said computed displacement of said unique pattern.

14. The positioning system of claim 13, wherein the sensor is an optical mouse type sensor for tracking patterns.

15. The positioning system of claim 13, wherein the sensor is a laser interferometer.

16. The positioning system of claim 13, wherein the optical path steering element is a mirror.

17. The positioning system of claim 13, wherein the steering mechanism is a piezoelectric device.

18. The positioning system of claim 13, further comprising a range finder.

19. The positioning system of claim 13, further comprising an inertial sensor.

* * * * *